G. R. STETSON.
Chucks.
No. 157,357.
Patented Dec. 1, 1874.
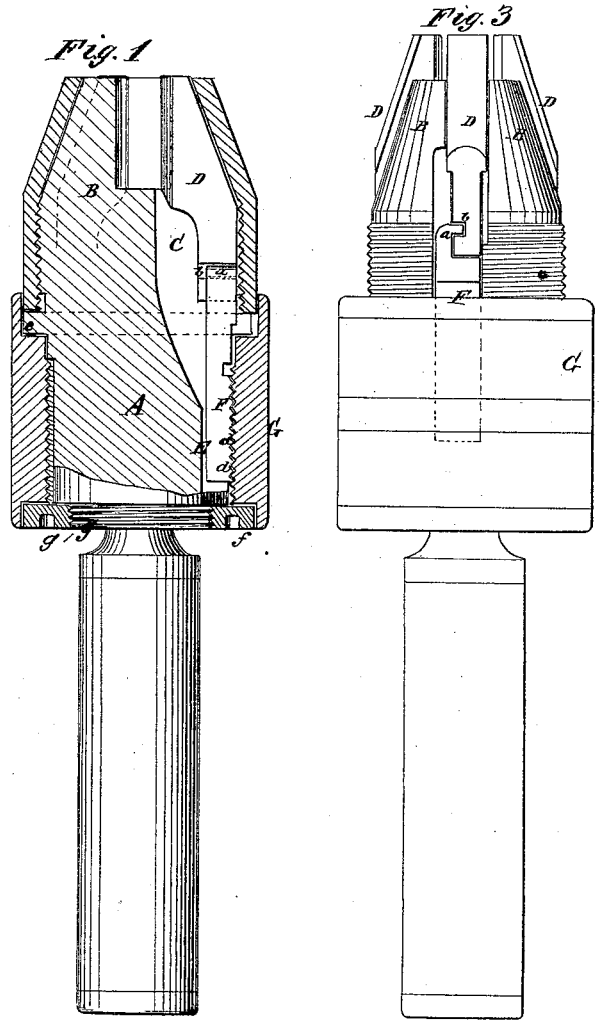

UNITED STATES PATENT OFFICE.

GEORGE R. STETSON, OF NEW BEDFORD, MASSACHUSETTS.

IMPROVEMENT IN CHUCKS.

Specification forming part of Letters Patent No. 157,357, dated December 1, 1874; application filed August 29, 1874.

*To all whom it may concern:*

Be it known that I, GEORGE R. STETSON, of New Bedford, Bristol county, Massachusetts, have invented a new and Improved Lathe-Chuck, of which the following is a specification:

In this improved chuck the radial guideways for the jaws are extended longitudinally through the solid body portion of the chuck, parallel with the axis, and drivers are arranged therein for working the jaws, said drivers being connected with the jaws by a flange on the side of one in a radial groove in the side of the other, so as to allow of radial motion to the jaws at the same time that they are moved longitudinally, and being geared by screw-threads on the outer edge and threads upon the inside of a ring or collar turning upon the body of the chuck, to be moved forward and backward for driving the jaws.

Figure 1 is a longitudinal sectional elevation of my improved chuck. Fig. 2 is a side elevation with the conical cap removed, and Fig. 3 is an end elevation.

Similar letters of reference indicate corresponding parts.

A represents the body portion of the chuck, having a conical head, B, in which are the usual guideways C, for the longitudinal and radial movement of the jaws D of a centering-chuck. These guideways extend the whole length of the body of the chuck, as shown at E, and fit a driver, F, in each, for working the jaws forward and backward by the ring or collar G, the said drivers being connected with the jaws, so as to allow them to move radially at the same time by a radial flange, *a*, on the side of one, say the driver, working in a radial groove in a jaw; also being connected with the collar by screw-threads *d* on the outer edge gearing with screw-threads on the inner periphery of the collar, and the collar being arranged between shoulders *e* and ring *f*, so as to be confined against endwise motion. Shoulder *e* is formed by a solid collar or flange on the body of the chuck, and ring *f* screwed on a shoulder, *g*, of the body, to keep the revolving collar G in place.

This contrivance for working the jaws is believed to be simpler, more durable, and easier to operate than other modes of spreading the jaws of centering-chucks.

Having thus described my invention, I claim as new and desire to secure by Letters Patent—

The improved lathe-chuck herein described, consisting essentially of the body A and head B, having guideways C E, the movable jaws D, and the screw-threaded drivers F, connected together by radial flanges and grooves *a b*, the encircling internally-threaded driving-sleeve G, and retaining-ring *f*, all constructed and relatively arranged to operate in the manner set forth.

GEORGE R. STETSON.

Witnesses:
JAS. H. C. RICHMOND,
ALBERT B. COLLINS.